United States Patent Office 2,828,603
Patented Apr. 1, 1958

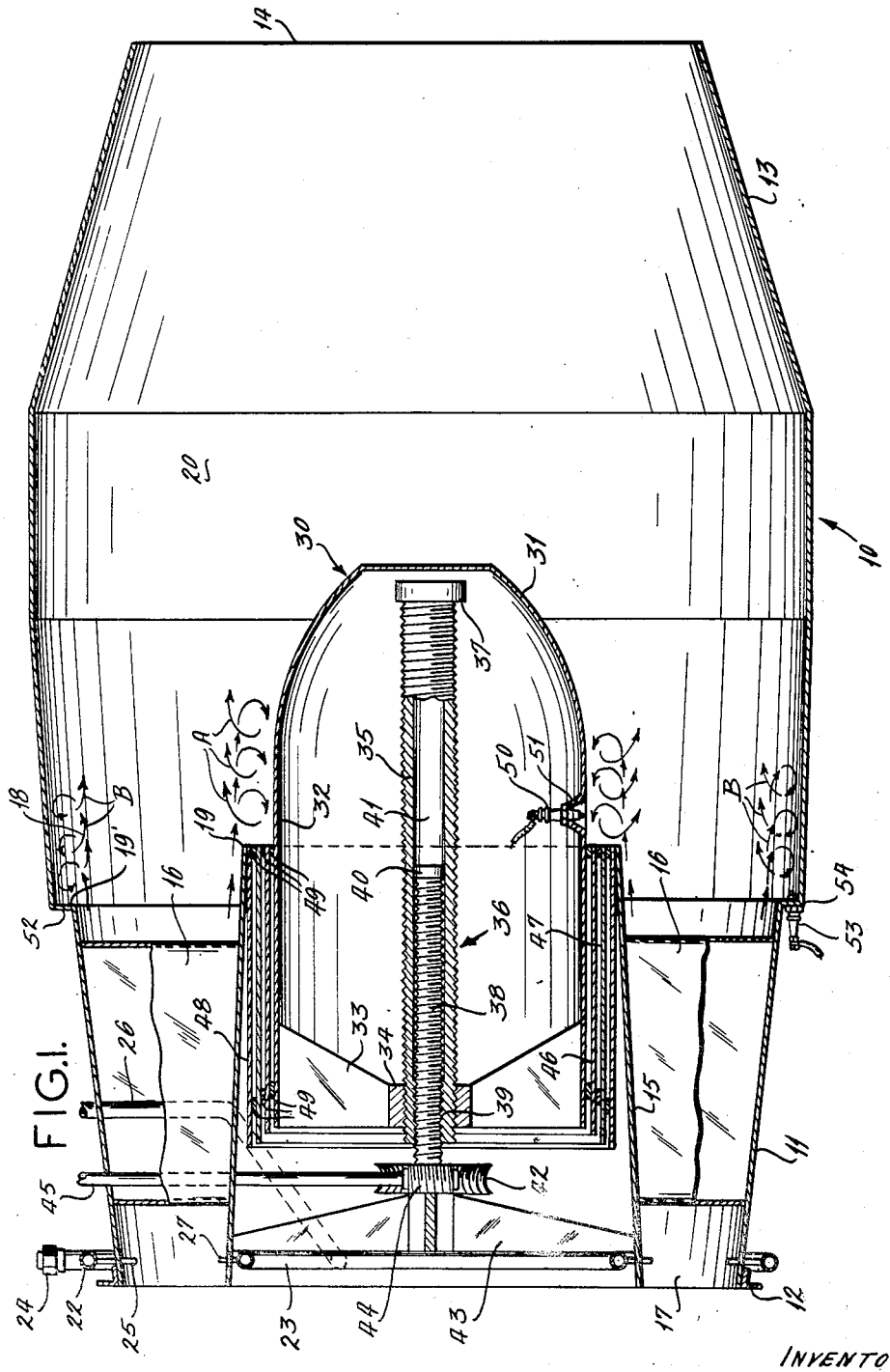

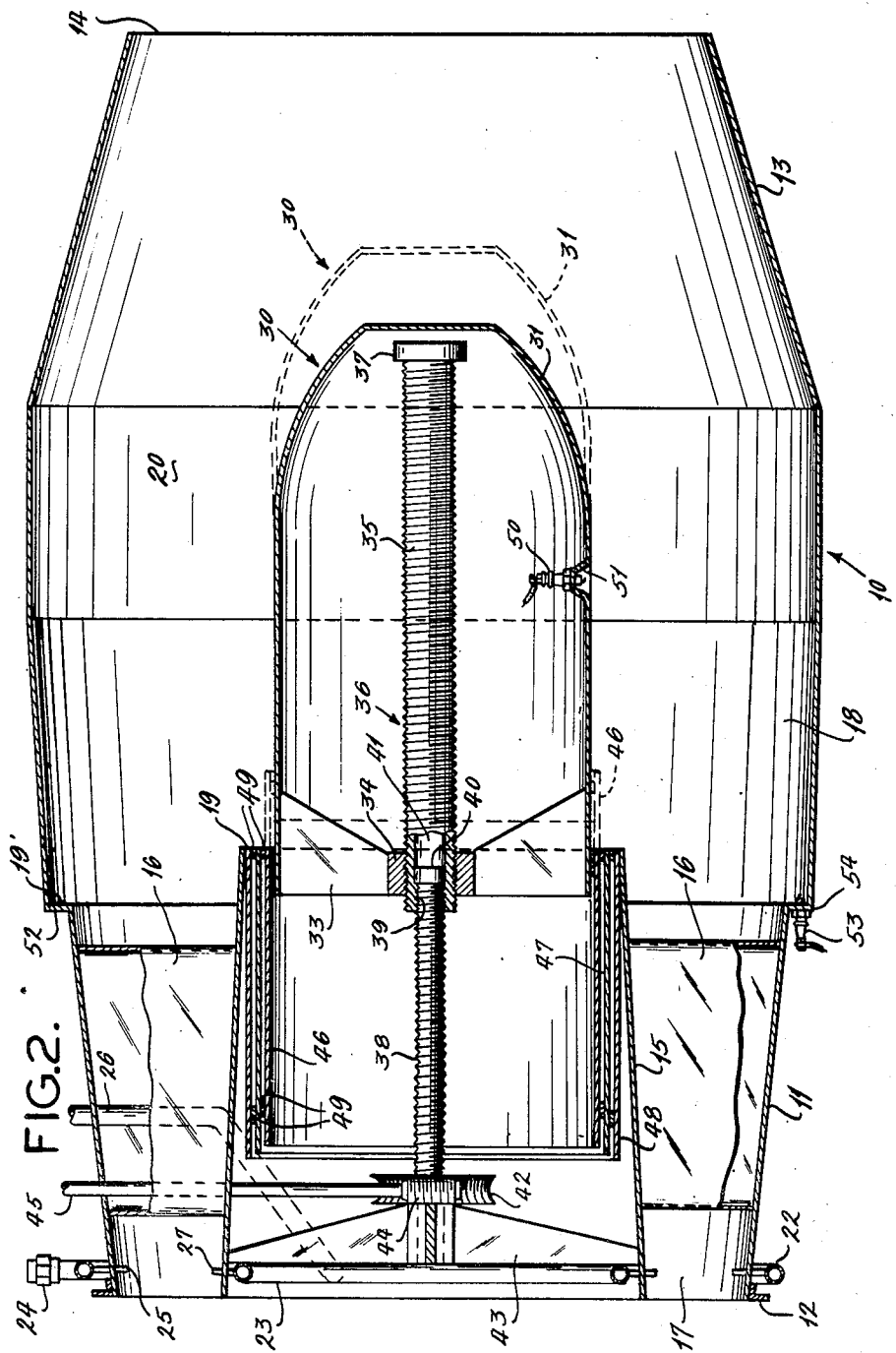

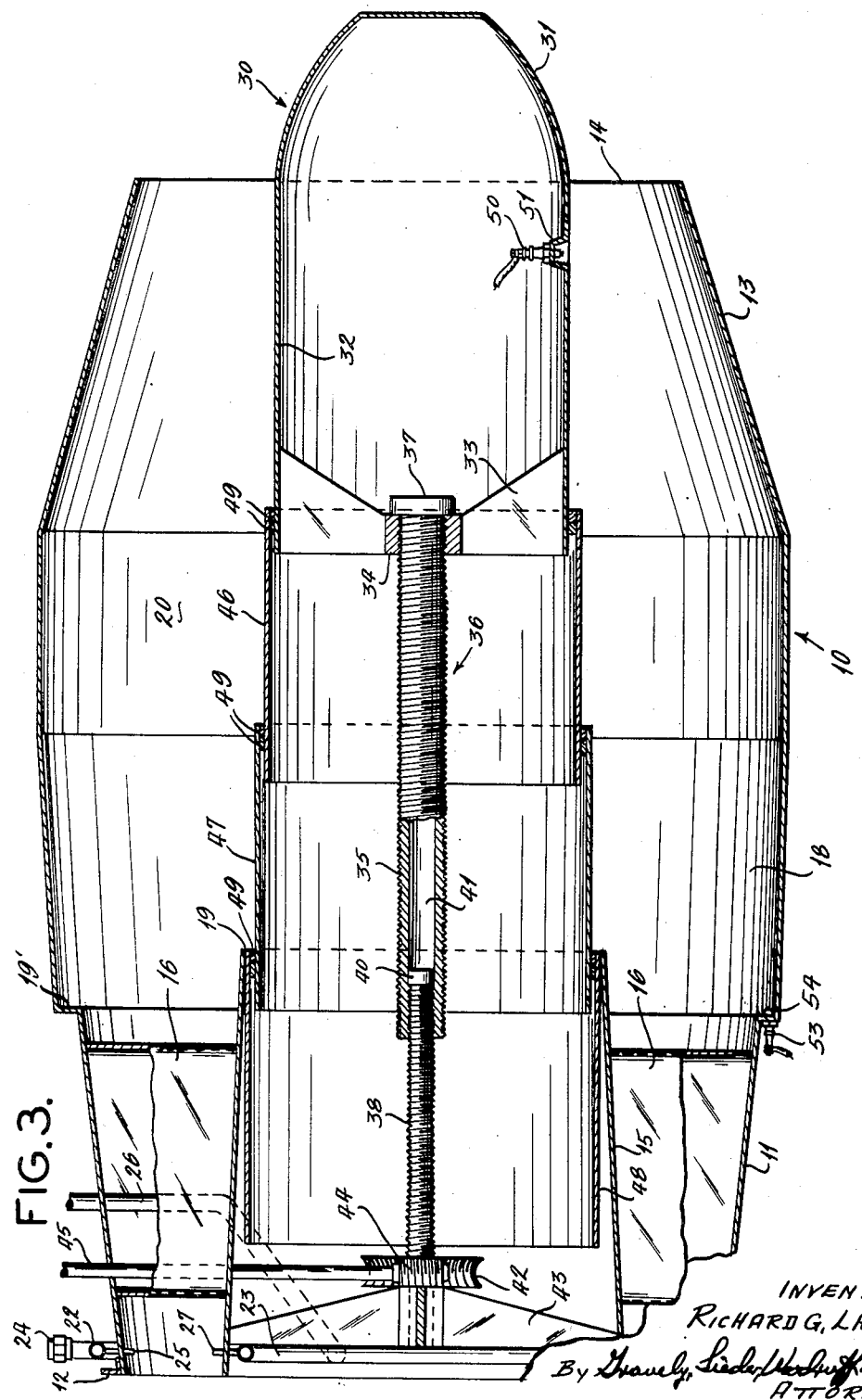

2,828,603

AFTERBURNER FOR TURBO JET ENGINES AND THE LIKE

Richard G. Laucher, Van Nuys, Calif., assignor, by mesne assignments, to Westinghouse Electric Corporation, a corporation of Pennsylvania Original application April 9, 1948, Serial No. 19,957, now Patent No. 2,637,972, dated May 12, 1953. Divided and this application March 16, 1953, Serial No. 342,389

1 Claim. (Cl. 60—35.6)

This invention relates to thrust producing devices and is more particularly directed to means for controlling as well as augmenting the thrust of a turbo jet engine or the like.

The object of the invention is to produce an afterburner for turbo jet engine use which is capable of utilizing the unused oxygen in the exhaust gases from the jet engine and to increase the temperatures and velocity of such exhaust gases for augmenting or increasing the total thrust of the jet engine.

Another object of the invention is to provide an afterburner for use with turbo jet engines and the like, whose operation is similar to that of a ram jet engine in order to increase the thrust of the turbo jet engine.

Another object of this invention is to provide an afterburner of the foregoing type having a variable exhaust nozzle so that the thrust output of the jet engine may be controlled, and in which the improved device also may be used solely as an afterburner to increase the thrust of the jet engine.

Still another object of this invention is to provide an exhaust nozzle area control means for jet engines which is capable of adjustment to vary the engine thrust.

The present invention constitutes a division of a previously filed application bearing Serial No. 19,957 and filing date of April 9, 1948, now Patent No. 2,637,972 granted May 12, 1953.

One of the features of the present device is the formation of a flameholder in the diffuser zone so that burning of the fuel starts within a short distance of the inlet end of the device, materially assisting in reducing the length of the afterburner casing thereby. The flameholder consists in diffuser cone means having one end abruptly terminating to form a step, such step defining a large area increase which causes eddy effects on the fuel and exhaust gas mixture which results in turbulence and consequent accelerated combustion. The turbulence increases the intimate mixing of fuel and residual oxygen from the turbo jet engine exhaust so that more complete combustion can be obtained in a very short distance from the inlet.

The present afterburner device consists in a casing having an inlet and an outlet, a diffusing cone member with a flameholder end step mounted adjacent the inlet, and extensible means associated with the cone member adjacent the flameholder step when the present device is utilized as an afterburner, and remote from the step to function as an exhaust nozzle area control means at times when afterburner operation is undesirable or unnecessary.

The present improvement consists also in those parts, combination of parts and construction thereof which will be more particularly described and pointed out in connection with the accompanying drawings, wherein:

Fig. 1 is a longitudinal sectional view of a preferred form of the afterburner device used in association with a turbo jet engine or the like, the view illustrating the device in its afterburner setting;

Fig. 2 is a view similar to Fig. 1, but showing the exhaust nozzle control member in partly extended positions; and, Fig. 3 is a view similar to the preceding figures, but showing the control device in its fully extended position for controlling the exit area of the exhaust nozzle.

In the several views, the afterburner device comprises a tubular casing 10 having a suitably shaped inlet member 11 provided with flange 12 for attachment to the exhaust flange of a turbo jet engine (not shown). The casing 10 is provided with an exhaust nozzle member 13 having an exhaust port 14. The device is provided internally with a diffusing cone 15 which is mounted in the inlet member 11 and is held in concentric spaced relation therein by means of a plurality of air foil struts 16. The inlet member 11 and diffusing cone 15 define an annular inlet passage 17 which has a diverging or expanding cross-section along the length of the diffusing cone 15 and opens into a diffusing chamber 18 which surrounds the trailing end or flameholder step 19 of the cone 15. Beyond the diffusing chamber 18 is the combustion chamber 20 which is located in the zone of the afterburner device which has the maximum diameter. The nozzle 13 tapers in a converging direction to the exhaust outlet 14.

Fuel is injected into the annular passage 17 between the diffusing cone 15 and the inlet member 11 by means of fuel supply manifolds 22 and 23. Manifold 22 circumscribes the inlet member 11 and is supplied by means of a suitable fuel inlet conduit 24, and the fuel is discharged into the passageway 17 through a plurality of circumferentially spaced nozzles 25 which project through the inlet member 11. In a similar manner, manifold 23 is supplied with fuel through an inlet conduit 26, and the fuel is discharged into the passage 17 through a plurality of circumferentially spaced discharge nozzles 27. The fuel inlet conduits 24 and 26 may be connected with a common fuel supply system (not shown). The present arrangement of fuel supply to the inlet end of the afterburner device is similar to that shown and described in the aforementioned application of which this constitutes a division.

Under some conditions of operation of the turbo jet engine, the thrust from the engine alone will be sufficient, and during this operation it may become necessary to control the thrust of the engine either for the sake of economy, or for other reasons. The present afterburner device is provided with an exhaust nozzle area control member in the form of a plug 30 which is movable rearwardly from the flameholder step 19 formed by the diffusing cone 15. The step 19 is partly defined by the cylindrical portion of plug 30 which has a smaller diameter than the end of the cone, and the annular gap therebetween is occupied by several telescoping related sleeves presently to be described.

The plug 30 is adapted to be moved or to be adjusted relative to the exhaust nozzle 13 so as to vary the effective area of the outlet end 14 thereof. In consequence of this, plug 30 is provided with a suitably closed end 31 of curved shape in cross-section, and a substantially cylindrical body portion 32. The open end of the plug member 30 is provided with a mounting spider 33 having a central hub 34 suitably threaded to receive one shaft member 35 of a screw jack device 36. The threaded member 35 is provided at its outer end with a stop 37, and is hollow to receive a cooperating threaded shaft member 38 therein which engages member 35 at the internally formed threads 39 in the inner end of member 35. The cooperating threaded shaft 38 is provided with a stop 40 which is free to move in the smooth bore 41 of member 35 within the limits of such bore. Shaft 38 is connected with a worm wheel 42 suitably bearinged in a spider 43 fixed within the end of the diffusing cone 15. The worm wheel 42 meshes with a worm gear 44 mounted on a drive shaft 45, and this shaft 45 extends through one of the air foil supporting struts 16 to a suitable power input device (not shown).

As seen in the several views of the drawing, operation of the worm gear 42 and worm wheel 44 causes relative rotation between the cooperating drive members 38 and 35, so that the member 35 is threaded or driven outwardly on the member 38. This action serves to extend the plug 30 (Fig. 2) into the combustion chamber zone 20 of the afterburner. Several positions of the plug 30 may be obtained as shown in dotted outline. This movement of plug 30 does not affect the flameholder step 19 at the rearward end of the diffusing cone 15. Continued operation of drive shaft 45 will cause the plug member 30 through the threaded connection with member 35 to move rearwardly beyond the positions shown in Fig. 2 to the position shown in Fig. 3.

In order to maintain a streamlined connection between the plug member 30 and diffusing cone 15 there is provided a plurality of concentrically located telescoping sleeves 46 and 47, although one such sleeve may be used. The plug 30, or at least the cylindrical portion 32 thereof, and the concentric sleeves 46 and 47 are adapted to be received in nested relation in the fixed guide sleeve 48 mounted within the diffusing cone 15. This construction will become obvious from an inspection of the several views in the accompanying drawing. The fully extended position of the plug 30 will effectively reduce the area of the exhaust port 14 of the exhaust nozzle 13 by extending into the zone of the nozzle. It is obvious that the plug 30 may be inwardly adjusted from its fully extended position to obtain variations in the effective area of the passage through the exhaust nozzle 13 as well as the effective area of port 14.

The telescoping sleeves 46 and 47, as well as plug member 30 and the inner guide sleeve 48 are provided with suitable annular sealing elements or rings 49, such elements also being utilized as stops to prevent disengagement of the several telescoping portions of this assembly, and as key means to prevent relative rotation among the plug and sleeves within the guide sleeve 48 so that longitudinal motion results.

In the afterburner operation of the present device, fuel at nozzles 25 and 27 is injected into the stream of exhaust gases from the turbo jet engine (not shown) which is located ahead of the inlet passage 17. This fuel combines with the unused or unexpended oxygen in this exhaust stream so that further combustion is made possible. Combustion of this oxygen and fresh fuel within the afterburner device is initiated by means of suitable spark plugs 50. One such plug (or several spark plugs) 50 may be mounted in the side wall of plug 30, as by the forming of a suitable cup depression 51 in the cylindrical portion 32. Another spark plug 53 may be mounted at the flange 54 in casing 10 which defines a change in section between the inlet member 11 and the diffuser member 18. This flange or wall 54 constitutes a flameholder step 19'.

The flow of gases past the step 19 of the diffuser cone 15 will be drawn into a reverse flow pattern or eddying effect shown diagrammatically by the arrows A in Fig. 1. It is this reduction in velocity and the mixing of fuel and available oxygen which holds the flame at this zone of the afterburner device. A similar reduction in velocity and eddy effect is produced at the step 19', as shown by arrows B in Fig. 1. After primary ignition of the fuel has been obtained in the foregoing manner, the incoming air and fuel stream following is continuously ignited by the flame from the burning gases in the eddy currents A which has thus been established at step 19 for the purpose of holding the flame in this zone. In a similar manner, the step 19' creates eddying currents B in the outer peripheral zone of the diffusing member 18 so that the spark plug device 53 may initiate a flame at this zone for the continuous ignition of fuel.

It is well known that ignition means in the engine may be utilized to ignite fuel in the device 10 by the streak ignition effect, where the flame is caused to travel through the engine and into the device. This streak ignition may be substituted for the spark devices 50 and 53.

In Fig. 2, it is obvious that intermediate positions of adjustment of the plug 30 will not affect the flameholder step 19, that is, will not reduce the change in section and thereby decrease the eddying effect due to such change in section.

The foregoing after burner simply and effectively combines a diffuser, flameholder and fuel injection means in such a manner that the losses caused by these parts on the high velocity discharge stream from the turbo jet engine will be maintained at a minimum. The present afterburner takes into account the fact that pressure losses from the turbo jet engine exhaust must be very small in order to maintain efficient operation, since losses of this sort penalize turbo jet engine performance. Accordingly, the present afterburner device is capable of handling exhaust gases from the turbo jet engine which pass through the passage 17, diffuser zone 18, combustion chamber 20 and exit through the nozzle 13 to a very minimum of loss.

Normal operation of the present device when not being used as an afterburner, is to have the plug 30 axially adjusted (Figs. 2 and 3) for the desired thrust producing operation of the turbo jet engine.

Afterburner operation may also be obtained with the plug adjusted to some intermediate position, such as that shown in Fig. 2, but this may not be necessary. Furthermore, the present device combines the inner flameholder step 19 with outer flameholder means such as the peripheral flameholder step 19' or the intermediate annular flameholder of divided, wedge type shown in the aforementioned prior application, so that substantially all of the fuel introduced by nozzles 25 and 27 is consumed to augment total thrust.

What is claimed is:

An afterburner and exhaust nozzle area control means for a reaction type engine comprising a casing having an inlet end securable to the exhaust end of the engine and an exhaust nozzle, the casing inlet end consisting in a tapering member connected to said exhaust nozzle by casing portions defining diffuser and combustion chambers, a diffuser cone mounted in said tapering member with its smaller end abruptly ended in said diffuser chamber to form a flameholder step, said diffuser cone and tapering member forming a passage for gases derived from the engine, fuel nozzles in said passage for supplying fuel to the engine exhaust gases, means for initially igniting fuel introduced into the passage, and longitudinally movable means in said casing to vary the exit area of said exhaust nozzle; said last means including a plug having an outer closed end, sleeve means connected between said plug and diffuser cone, and screw jack means operatively mounted in said diffuser cone and connected to said plug, said screw jack means selectively moving said plug between a position in said exhaust nozzle and a position adjacent said flameholder step.

References Cited in the file of this patent

UNITED STATES PATENTS

| | | |
|---|---|---|
| 2,402,363 | Bradbury | June 18, 1946 |
| 2,516,819 | Whittle | July 25, 1950 |
| 2,589,548 | Imbert | Mar. 18, 1952 |
| 2,620,626 | Lysholm | Dec. 9, 1952 |
| 2,637,972 | Laucher | May 12, 1953 |